(No Model.)  2 Sheets—Sheet 1.

P. H. IRGENS.
SHOCK CONTROLLING DEVICE.

No. 478,434. Patented July 5, 1892.

Witnesses:— Inventor:
Paul H. Irgens,
By James L. Norris.
Attorney.

THE NORRIS PETERS CO., PHOTO-LITHO., WASHINGTON, D. C.

(No Model.) 2 Sheets—Sheet 2.

P. H. IRGENS.
SHOCK CONTROLLING DEVICE.

No. 478,434. Patented July 5, 1892.

Witnesses:
J. A. Rutherford.
Robert Everett.

Inventor:
Paul H. Irgens
By James L. Norris.
Attorney.

UNITED STATES PATENT OFFICE.

PAUL HENNING IRGENS, OF CHRISTIANIA, NORWAY.

SHOCK-CONTROLLING DEVICE.

SPECIFICATION forming part of Letters Patent No. 478,434, dated July 5, 1892.

Application filed February 20, 1892. Serial No. 422,271. (No model.) Patented in Norway November 11, 1891, No. 2,321.

*To all whom it may concern:*

Be it known that I, PAUL HENNING IRGENS, a subject of the King of Sweden and Norway, and a resident of Christiania, Norway, have invented a certain new and useful Improvement in Shock-Controlling Devices, (for which I have obtained a patent in Norway, No. 2,321, dated November 11, 1891,) of which the following is a specification.

This invention relates to an apparatus which has for its object to prevent or control the shock which is caused in reversing propeller-shafts, the shafts of carriage and other wheels, and the like, said shock being caused during the reversal of the motion of the shaft by means of a friction-clutch. As the aforesaid shocks very often cause breaking of the shaft or the teeth of the gears, it will be readily understood that it is very important that they should be efficiently controlled or checked, which result is obtained by the present invention.

Figure 1:
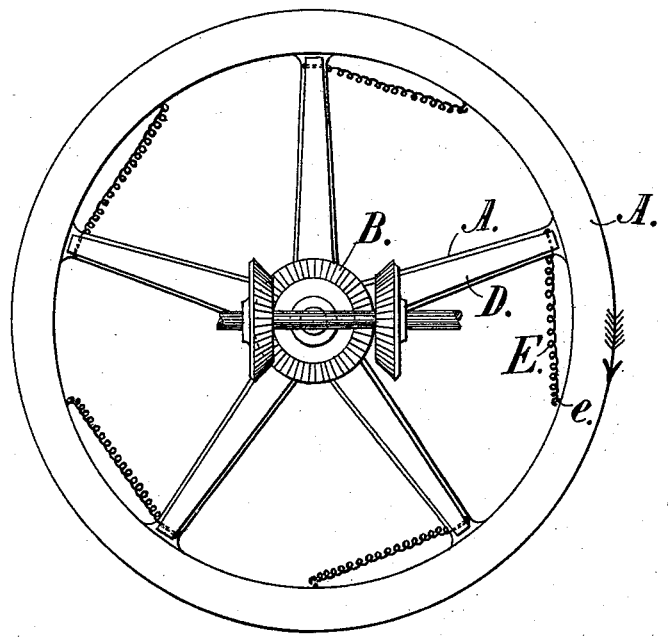
Figure 2:
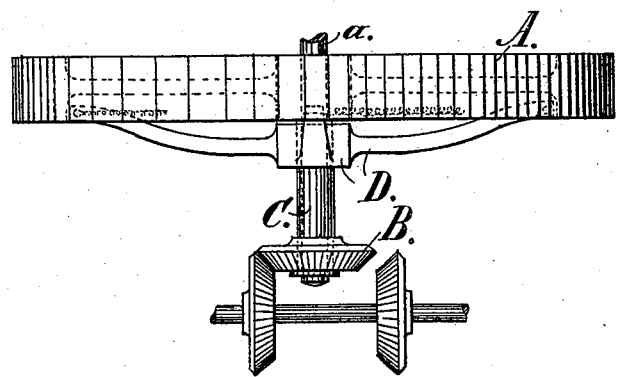
Figure 3:
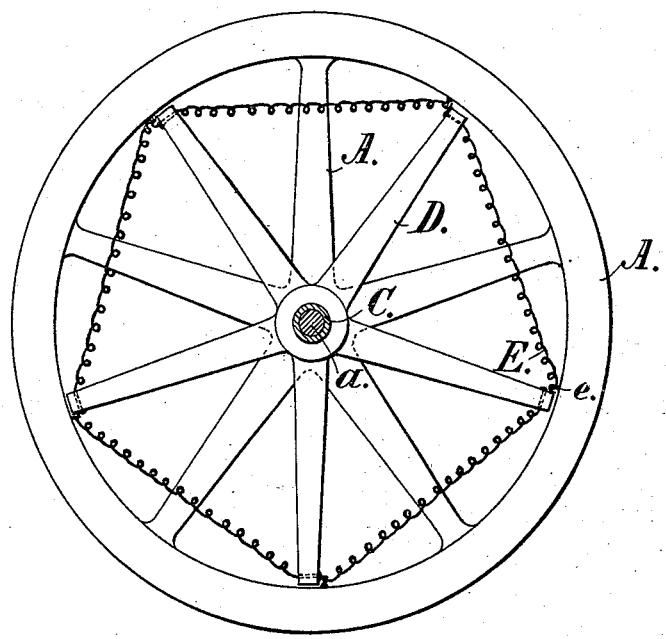
Figure 4:
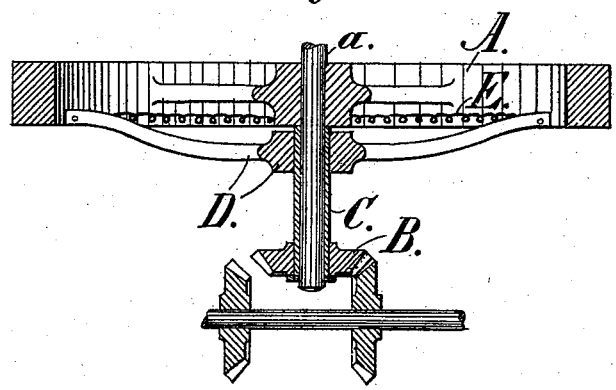

In the accompanying drawings, Figure 1 shows a fly-wheel with the improved apparatus applied thereto. Fig. 2 shows a plan of the same. Fig. 3 shows a fly-wheel with the apparatus in the position it occupies at the moment the propeller-shaft is reversed. Fig. 4 shows a horizontal section of the same.

In the drawings the letter A indicates a fly-wheel, which is suitably secured to a driving-shaft $a$, carrying a sleeve C, adapted to turn on the shaft. The driving-wheel B is secured to the lower part of the sleeve, and to the upper part of this sleeve is secured the rotating frame D of the shock-controller. As here shown, the frame of the shock-controller comprises a hub and a series of radial arms. These arms are connected at their outer ends with the fly-wheel A through the medium of stiff spiral springs E. The hooks $e$, to which the spiral springs are fastened, serve, also, as stops for the arms of the shock-controller or the knobs on it if it is made in the form of a disk to bear upon. The said shock-controller is put into operation when the gearing is thrown into gear with the driving-shaft, and the shock caused by the teeth of the gear engaging each other is taken up by the spiral springs E, the driving-wheel for a moment stopping, while the fly-wheel, that is directly fastened to the shaft, continues its motion unchanged, as indicated in Figs. 3 and 4. As the speed of the driving-wheel increases and approaches the speed of the fly-wheel the spiral springs will again contract and the apparatus will take up its normal position, as in Fig. 1.

What I claim is—

The herein-described apparatus for controlling the shock caused by the sudden reversal of propeller-shafts and carriage and other wheels, consisting of a shaft, a fly-wheel mounted thereon, a sleeve rotatable on said shaft, a driving-wheel at one end of said sleeve, a rotating frame secured to the other end of said sleeve, and springs connecting said frame with the fly-wheel, substantially as described.

In testimony that I claim the foregoing as my invention I have signed my name, in presence of two witnesses, this 27th day of January, 1892.

PAUL HENNING IRGENS.

Witnesses:
T. F. ECHERSBERG,
M. PAULSSEN.